United States Patent [19]

Metoyer

[11] Patent Number: 4,596,313
[45] Date of Patent: Jun. 24, 1986

[54] CENTERING DEVICE FOR FLOATING CALIPER BRAKES

[75] Inventor: Anthony Metoyer, South Bend, Ind.

[73] Assignee: Clark Equipment Company, Buchanan, Mich.

[21] Appl. No.: 716,074

[22] Filed: Mar. 26, 1985

[51] Int. Cl.⁴ .................. B60T 1/06; F16D 55/22
[52] U.S. Cl. .................. 188/18 A; 188/72.3; 188/73.44
[58] Field of Search .......... 188/18 A, 71.1, 72.3, 188/73.43, 73.44, 17 D, 368, 37 D, 79.5 S, 196 M, 73.39, 73.46, 73.35, 73.36, 73.45

[56] References Cited

U.S. PATENT DOCUMENTS

| | | | |
|---|---|---|---|
| 3,150,745 | 9/1964 | Eksergian | 188/72.3 |
| 3,465,849 | 9/1969 | Bernfeld et al. | 188/196 M X |
| 4,265,340 | 5/1981 | Scott et al. | 188/73.44 |
| 4,372,428 | 2/1983 | Delaunay et al. | 188/73.35 |
| 4,393,963 | 7/1983 | Oltmanns, Jr. et al. | 188/73.45 |
| 4,410,069 | 10/1983 | Schreiner et al. | 188/73.36 |
| 4,436,186 | 3/1984 | Ritsema et al. | 188/71.8 |

FOREIGN PATENT DOCUMENTS 0072066  6/1977  Japan .................. 188/170

Primary Examiner—Bruce H. Stoner, Jr.
Assistant Examiner—Robert J. Oberleitner
Attorney, Agent, or Firm—John C. Wiessler

[57] ABSTRACT

A centering device for a floating caliper brake which has a cap screw extending through an opening in the brake mounting plate. A lock nut on the cap screw abuts the inner surface of the mounting plate. A centering spring surrounds the cap screw in abutment with the outer surface of the mounting plate. Together they maintain clearance on both sides of the brake disc when the brake is not applied.

5 Claims, 1 Drawing Figure

U.S. Patent Jun. 24, 1986 4,596,313
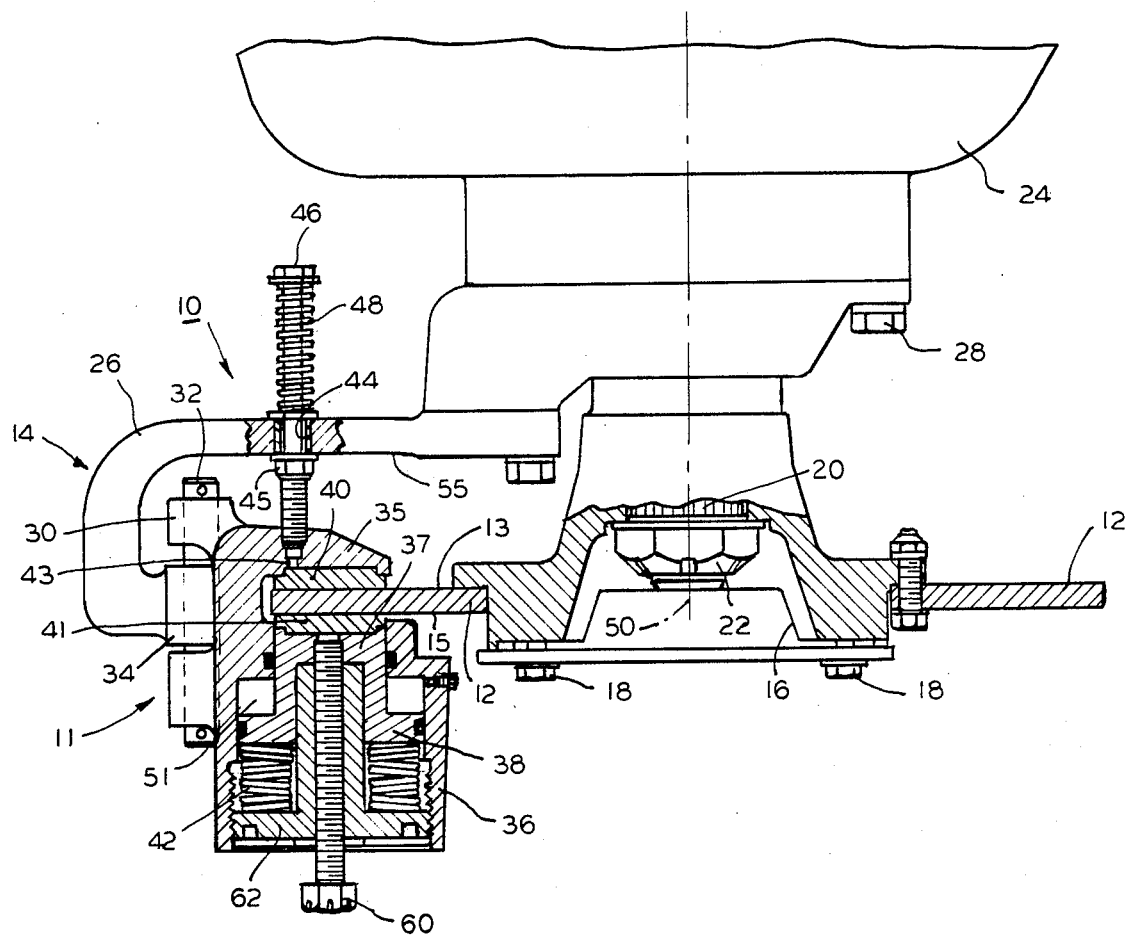

CENTERING DEVICE FOR FLOATING CALIPER BRAKES

BACKGROUND OF THE INVENTION

1. Field of the Invention

This invention relates to a centering device for minimizing drag and hence wear of a floating caliper type brake during the time the brake is not applied.

2. Description of the Prior Art

A floating caliper disc brake includes a disc or rotor having friction surfaces on opposite sides of the disc with a caliper straddling the disc and carrying a pair of friction elements or linings which interact with the friction surfaces on the disc when a brake application is effected. During a brake application rotation of the disc is retarded responsively to the forces by which the friction elements are pressed against the disc. A non-rotating brake support plate carries the caliper on a mounting pin or pins and limits movements of the caliper. The caliper is movable, or floats, on the pins to a limited extent relative to the disc and support plate. A problem with brakes of this type is that external forces, such as gravity, brake line weight and inertia cause the brake linings to rub against the disc, producing a drag and causing wear of the linings when the brake is not applied. Heretofore attempts have been made to solve the disc drag problem by altering the pin or pins by which the floating caliper is mounted on the brake support plate or closely associated structure. Examples of such prior art structures are illustrated by U.S. Pat. Nos. 4,265,340 Scott et al, 4,372,428 Delaunay et al, 4,393,963 Oltmanns, Jr., 4,410,069 Schreiner et al, and 4,436,186 Ritsema et al. The present invention solves the disc drag problem by the use of a centering device which is separated from the mounting pin or pins.

SUMMARY OF THE INVENTION

The present invention is a centering device for a disc brake mechanism which has a mounting plate, a brake caliper carrying inner and outer brake linings, and at least one pin by which the caliper is loosely secured to the mounting plate. The invention includes an opening through the mounting plate separate from the pin, a cap screw which extends through the opening in said caliper, a lock nut on the cap screw and a centering spring. The inner brake lining is kept away from the disc surface by the force of the centering spring, and the outer brake lining is kept away from the disc surface by the position of the lock nut on the cap screw.

BRIEF DESCRIPTION OF THE DRAWING

The single FIGURE of the drawing illustrates a centering device for a floating caliper brake in accordance with the present invention.

DESCRIPTION OF THE PREFERRED EMBODIMENT

On the drawing the numeral 10 designates generally the centering device of the present invention for a brake mechanism 11. The brake mechanism 11 illustrated comprises a rotatable brake disc 12 and a non-rotatable support and caliper structure which is indicated generally by the numeral 14. The disc 12 is secured on a hub member 16 by cap screws 18, and hub 16 in turn is secured to a shaft 20 by a nut 22. The disc 12 rotates in unison with the shaft 20 which is connected to an axle and differential mechanism within the housing 24.

The non-rotatable portion 14 of the brake mechanism 11 includes a mounting plate 26 which is secured in a suitable manner such as by cap screws 28 to the housing 24. A caliper mechanism 30 is loosely mounted on a pin 32 which is carried by portion 34 of housing 26. The caliper mechanism 30 is bifurcated having backing plate portions 35 and 37 of it on either side of or straddling disc 12.

The caliper portion 30 of the brake also includes a housing portion 36 which houses a piston 38 which moves inwardly and outwardly to apply and release the brake. Brake linings or pads 40 and 41 are located closely adjacent each of the opposite surfaces 13 and 15 of disc 12 and are carried by backing plate portions 35 and 37 respectively. A compression spring 42 urges the piston 38 and its integral backing plate portion 37 and thus lining 41 against disc 12 and when it is not restrained it applies the brake by pressure against lining pad 41 which causes the disc 12 to be pinched between the two linings 40 and 41, thus applying the brake. In other words, the brake illustrated is spring applied and hydraulically released. Releasing the brake is accomplished by applying hydraulic pressure to chamber 51; pressure in chamber 51 urges piston 38 and lining 41 away from disc 12 by compressing spring 42, thereby releasing the brake.

The centering device 10 for the disc brake mechanism 11 includes an unthreaded opening 44 through mounting plate 26. A cap screw 46 extends through opening 44 and thus through mounting plate 26 to where its inner end is threaded into a mating hole in backing plate 35 which carries lining 40. A lock nut 45 on cap screw 46 determines the distance between inner surface 43 of lining 40 and the surface 55 of mounting plate 26. The caliper mechanism 30 is sufficiently loose on pin 32 that it can move axially, radially and circumferentially relative to axis 50 of shaft 20 although such movement is barely perceptible. At the time of the assembly of a brake mechanism 11 embodying this invention the cap screw 46 is put through opening 44 and threaded into plate 35. Then the lock nut 45 is adjusted to maintain the desired space between surfaces 13 on disc 12 and surface 55 on plate 26. The adjustment of the other side of the caliper is carried out by a cap screw 60 which is threaded into backing plate portion 37, the screw 60 extending through an aperture in spring retaining cap 62; the screw 60 is adjusted relative to portion 37 until the desired clearance between brake lining 41 and the outer surface 15 of disc 12 is achieved. When the brake 11 is applied the centering spring 48 around cap screw 46 collapses and the brake applies normally.

In this invention the inner brake lining 40 is kept away from the inner surface 13 of disc 12 by the force of centering spring 48 while the outer brake lining 41 is kept away from the outer disc surface 15 by the position of the lock nut 45 on the cap screw 46. The expression "kept away" is used here to indicate that because of the centering device of this invention there is a clearance on each side of disc 12 between it and linings 40 and 41 respectively. This invention reduces drag and thus wear on the bearing linings.

While I have illustrated and described herein a preferred embodiment of my invention, which is the best mode contemplated for its use, it will be appreciated that modifications may be made. Accordingly, it should be understood that I intend to cover by the appended claims all such modifications which fall within the true spirit and scope of my invention.

I claim:

1. A centering device for a disc brake mechanism which has a rotatable disc, a non-rotatable mounting plate, a brake caliper loosely secured to said mounting plate and carrying inner and outer brake linings which straddle said disc, and at least one pin by which said caliper is loosely secured to said mounting plate, comprising an unthreaded opening through said mounting plate separate from said pin, a cap screw extending through said opening to engage said caliper, a lock nut on said cap screw inwardly of said opening, adjacent the inner lining, and a centering spring around said cap screw outwardly of said opening, the inner brake lining being kept away from the inner surface of the disc by the force of said centering spring, and the outer brake lining being kept away from the outer surface of the disc by the position of said lock nut on the cap screw, when the brake is not applied.

2. A centering device as in claim 1 wherein said disc brake mechanism is spring applied and fluid pressure released.

3. A centering device as in claim 1 wherein said caliper includes an integral cylindrical opening and a hydraulic piston operable in said opening.

4. A centering device as in claim 3 wherein said piston carries an adjuster screw which is connected to said outer brake lining.

5. A centering device as in claim 1 wherein said disc is connected to a shaft of a machine and said mounting plate is connected to the housing of said machine.

* * * * *